(12) United States Patent
Natarajan et al.

(10) Patent No.: US 12,547,541 B2
(45) Date of Patent: Feb. 10, 2026

(54) HOST MANAGED HOTNESS DATA UTILIZED FOR CACHE EVICTIONS AND/OR INSERTIONS

(71) Applicant: SK Hynix NAND Product Solutions Corp., Rancho Cordova, CA (US)

(72) Inventors: Shankar Natarajan, Folsom, CA (US); Chace Clark, Hilsboro, TX (US); Francis Corrado, Redwood City, CA (US); Shivashekar Muralishankar, Folsom, CA (US); Suresh Nagarajan, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 912 days.

(21) Appl. No.: 17/475,984

(22) Filed: Sep. 15, 2021

(65) Prior Publication Data

US 2022/0004495 A1 Jan. 6, 2022

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0679* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 2003/0200393 A1* | 10/2003 | Cornaby | G06F 12/123 711/E12.071 |
| 2009/0175077 A1* | 7/2009 | Takase | G11C 11/5628 365/185.11 |
| 2016/0070643 A1* | 3/2016 | Shen | G11C 13/0035 711/103 |
| 2018/0150225 A1* | 5/2018 | Chang | G06F 3/0679 |
| 2019/0187900 A1* | 6/2019 | Byun | G06F 3/061 |
| 2019/0332298 A1* | 10/2019 | Madabhushi | G06F 3/0679 |
| 2020/0201549 A1* | 6/2020 | Malina | G06F 3/0659 |
| 2022/0035735 A1* | 2/2022 | Bhardwaj | G06F 12/0246 |
| 2022/0083258 A1* | 3/2022 | You | G06F 3/0679 |
| 2022/0091984 A1* | 3/2022 | Das | G06F 3/0616 |
| 2022/0197535 A1* | 6/2022 | Peh | G06F 3/0608 |
| 2022/0334768 A1* | 10/2022 | Patil | G06F 12/10 |
| 2023/0140773 A1* | 5/2023 | Raju | G06F 3/064 711/154 |

* cited by examiner

*Primary Examiner* — Stephanie Wu
(74) *Attorney, Agent, or Firm* — HG LAW LLP (57) ABSTRACT

Systems, apparatuses, and methods provide for a memory controller to manage cache evictions and/or insertions in a data server environment based at least in part on host managed hotness data. For example, a memory controller includes logic to receive a plurality of read and write requests from a host, where the plurality of read and write requests include an associated hotness data. A valid unit count of operational memory cells is maintained on a block-by-block basis for a plurality of memory blocks. A hotness index count is also maintained based at least in part on the hotness data on a block-by-block basis for the plurality of memory blocks. One or more memory blocks of the plurality of memory blocks are selected for eviction from a single level cell region to an x-level cell region based at least in part on the valid unit count and the hotness index count.

13 Claims, 9 Drawing Sheets

FW architecture:                                                                                                500

Input: FW will receive the details of hot vs cold data units    The unit size granularity is TBD (4K or higher)

Write Flow:

Step#1:

FW will maintain 2 arrays

Arrays

| | | | |
|---|---|---|---|
| 1 ValidUnitsCntr[Blocks] | 250 Blocks | 4 bytes | Already exist |
| 2 HotnessIdxCntr[Blocks] | 250 Blocks | 4 bytes | New (to be used only for SLC blocks) |

Step#2:

FW will assign weights for the 2 arrays depending on the state of the drive and compute the weighted hotness/validity quotient for each block

| Assign weights | W1 = validity | W2 = Hotness | |
|---|---|---|---|
| Initially (0-50% prefill) | W2 > W1 | | W1=2 W2=6 |
| 50%, 75% | W2 = W1 | | W1=4 W2=4 |
| 75%,100% | W1 > W2 | | W1=6 W2=2 |

Loop ( all the src blocks in LINK)

compute the weighted hotness = W1*validity + W2*Hotness/(W1+W2)

Find the lowest weighted hotness value and choose that block as victim block

Step#3

FW will chose the block for eviction based on the following priority

| Priority | valid, hotness picking the victim block (src block) | |
|---|---|---|
| 1 | Low validity | Low Hotness |
| 2 | High validity | Low Hotness |
| 3 | Low validity | High Hotness |
| 4 | High validity | High Hotness |

HOST MANAGED HOTNESS DATA UTILIZED FOR CACHE EVICTIONS AND/OR INSERTIONS

TECHNICAL FIELD

Embodiments generally relate to memory controllers. More particularly, embodiments relate to memory controllers to manage cache evictions and/or insertions in a data server environment based at least in part on host managed hotness data.

BACKGROUND

Single-level cell (SLC) buffers may include NAND-type flash memory (NAND memory) that is organized into multiple cells, with each cell containing one bit of data. Tri-level cell (TLC) memory may include NAND memory that is organized into multiple cells, with each cell containing three bits of data. Quad-level cell (QLC) memory may include NAND memory that is organized into multiple cells, with each cell containing four bits of data. The number of bits per cell may generally depend on how many distinct voltage levels used during program operation(s) associated with writing to, reading from and/or erasing the cell. Thus, in the case of TLC memory, to support three bits per cell, eight voltage levels may be used to distinguish between the eight possible combinations of ones and zeros (e.g., 000, 001, 010, 011, 100, 101, 110, 111) written to the cell.

Some memory systems include technology to determine a programmable eviction ratio associated with a storage device and convert a portion of a SLC region in the storage device into an x-level cell (XLC) region in accordance with the programmable eviction ratio. XLC may include double-level cell (DLC) (e.g., 2 bit per cell XLC), TLC (e.g., 3 bit per cell XLC), QLC (e.g., 4 bit per cell XLC), etc. For example, the amount of the portion converted into the XLC region typically varies gradually as a function of percent capacity filled in the storage device.

QLC solid state drive (SSDs) typically use an SLC first algorithm. In such an SLC first algorithm, host data is typically first written to SLC and when SLC is filled up then it is evicted to QLC. In such implementations, there is typically about a 300% performance difference between the SLC (fast media) as compared to the QLC (slow media) in low queue depth random workloads. User trace studies have also shown that more data is read out of the QLC than the SLC, thereby resulting in inconsistent performance over time.

One approach used for managing eviction has included the host itself managing the data. In such implementations, the host manages the data in such a way that when data becomes cold, a host driver will read the data back from fast media and write to Slow media (and vice-versa when hot data is to be moved from cold media to hot). However, host managed approaches suffer from potentially increasing power consumption for the entire system and/or at the SSD.

A further approach used for managing eviction has included using SSD dynamic random access memory (DRAM) to hold data structures/buffers, which support complex bloom filter algorithms. However, such approaches suffer from requiring the use of DRAM and take additional processor time to execute.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

As discussed above, several approaches have been used for managing evictions. Another approach that can be used for managing evictions includes hinting between a host and a storage device. However, such hinting has typically been very rudimentary (e.g., a simple classification).

As will be described in greater detail below, some implementations described herein utilize low overhead host software to provide higher quality hints to the storage device. In such implementations, hot data (e.g., high priority data) is detected and kept in SLC for long periods, thereby providing more consistent, SLC performance. For example, separating hot data (e.g., high priority data), which is accessed more frequently than low priority data (e.g., data accessed less frequently) advantageously result in better SSD performance during system boot, gaming loads, and other SSD benchmarks.

Figure 1:
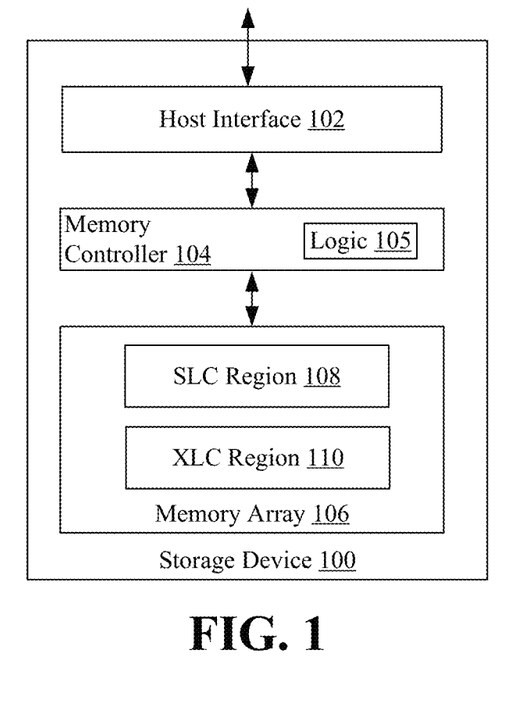
FIG. 1 is a block diagram of an example storage device according to an embodiment.

FIG. 1 is a block diagram of a storage device 100 shared by a plurality of users. The storage device 100 includes a host interface 102, a memory controller 104 that includes logic 105, and a memory array 106 that includes a single level cell region 108 and an x-level cell region 110.

The storage device 100 is implementable in several formats. For example, storage device 100 is implementable as an SSD. For example, such an SSD is implementable as a single-level cell (SLC) SSD, a double-level cell (DLC) SSD, a triple-layer cell (TLC) SSD, a quad-level cell (QLC) SSD, a penta-level cell (PLC) SSD, a transistor-less stackable cross point SSD architecture (e.g., INTEL OPTANE SSD), or the like. As used herein, the term "x-level cell" (XLC) refers to double-level cell (DLC) (e.g., 2 bit per cell XLC), TLC (e.g., 3 bit per cell XLC), QLC (e.g., 4 bit per cell XLC), penta-level cell (PLC) (e.g., 5 bit per cell XLC), the like, and/or combinations thereof.

In some embodiments, the host interface 102 communicatively couples memory controller 104 to a host (not shown). For example, host interface 102 communicatively couples memory controller 104 to the host using the NVMe (NVM express) protocol over PCIe (Peripheral Component Interconnect Express) or Fabric. Commands (for example, read, write ("program"), and/or erase commands for the memory array 106) received from the host are queued and processed by the memory controller 104. The logic 105 of memory controller is implementable via transistor array, other integrated circuit/IC components, the like, and combinations thereof. In some examples, the logic 105 of the memory controller 104 is integrated onto a semiconductor die, as will be discussed in greater detail below with respect to FIG. 8. In some examples, the logic 105 of memory controller 104, which may include one or more of configurable or fixed-functionality hardware, is configured to perform one or more aspects of the method 600 (FIG. 6) and/or the method 700 (FIG. 7), which are discussed in more detail below.

In implementations where the storage device 100 is an SSD, the SSD includes memory array 106 that is a non-volatile (NVM) memory. In such an embodiment, the memory array 106 includes the single level cell region 108 and the x-level cell region 110. For example, the single level cell region 108 is implemented as a single-level cell (SLC) SSD, while the x-level cell region 110 is implemented as a double-level cell (DLC) SSD, a triple-layer cell (TLC) SSD, a quad-level cell (QLC) SSD, a penta-level cell (PLC) SSD, the like, and/or combinations thereof.

As will be described in greater detail below, the memory controller 104 manages cache evictions and/or insertions in a data server environment based at least in part on host managed hotness data. For example, the memory controller 104 of a memory device (e.g., storage device 100) is capable of receiving a plurality of read and write requests from a host, where the plurality of read and write requests include an associated hotness data. In response, the memory controller 104 is capable of maintaining a valid unit count of operational memory cells and/or maintaining a hotness index count. In such an example, the memory controller 104 is capable of maintaining a valid unit count of operational memory cells on a block-by-block basis for a plurality of memory blocks. Similarly, the memory controller 104 is capable of maintaining a hotness index count based at least in part on the hotness data, where the hotness index count is maintained on a block-by-block basis for the plurality of memory blocks. The memory controller 104 is capable of selecting one or more memory blocks of the plurality of memory blocks for eviction based at least in part on the valid unit count and the hotness index count, where the eviction is from the single level cell region 108 to the x-level cell region 110.

Figure 2:
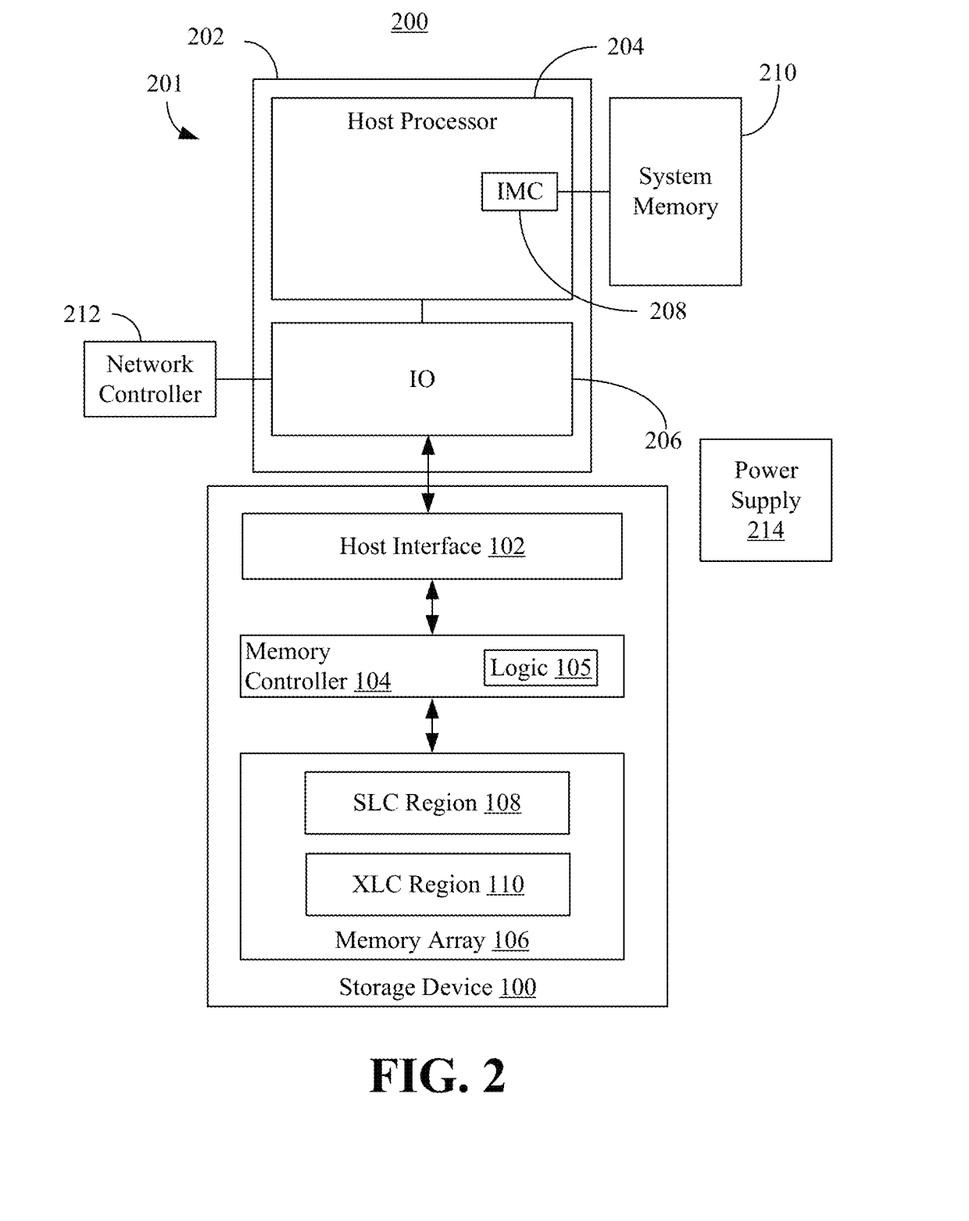
FIG. 2 is an illustration of an example of a cloud computing system according to an embodiment.

Turning now to FIG. 2, a cloud computing system 200 is shown. In the illustrated example, storage device 100 (e.g., a solid state drive (SSD)) is in communication with a host 201.

The illustrated cloud computing system 200 also includes a system on chip (SoC) 202 having a host processor 204 (e.g., central processing unit/CPU) and an input/output (IO) module 206. The host processor 204 typically includes an integrated memory controller (IMC) 208 that communicates with system memory 210 (e.g., dynamic random access memory/DRAM). The illustrated IO module 206 is coupled to the storage device 100 (e.g., a solid state drive (SSD)) as well as other system components such as a network controller 212. The illustrated cloud computing system 200 may include other components, such as power supply 214 (e.g., a power supply to provide power to the storage device 100), for example.

The storage devices 100 may be part of a memory device that includes non-volatile memory and/or volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD235, JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 3:
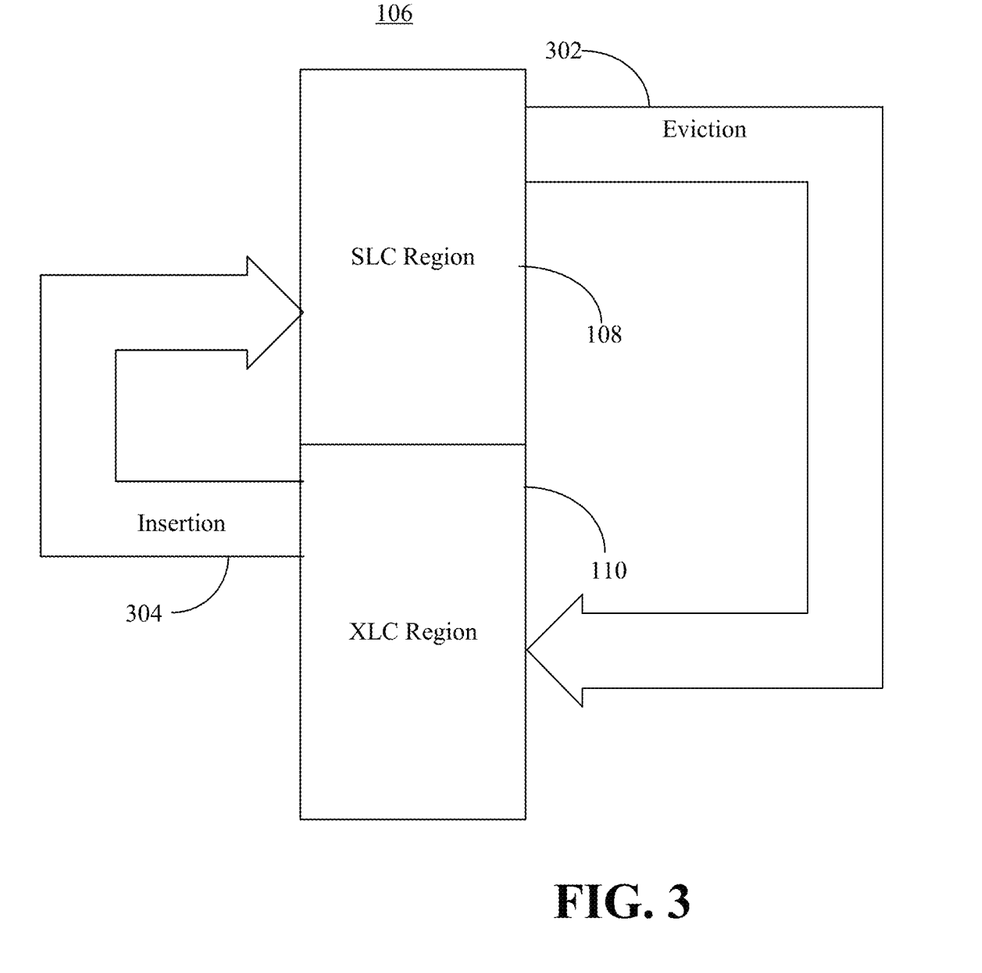
FIG. 3 is a block diagram of an example of a memory array according to an embodiment.

FIG. 3 shows an illustrative example of the memory array 106. In the illustrated example, the memory array 106 includes the single-level cell (SLC) region 108 and the x-level cell (XLC) 110. As illustrated, memory blocks in the SLC region 108 are capable of being converted into the XLC region 110 memory blocks via an eviction 302 policy. Additionally, or alternatively, memory blocks in the XLC region 110 are capable of being converted into the single-level cell (SLC) region 108 memory blocks via an insertion 304 policy.

In operation, memory blocks in the SLC region 24 are capable of being subject to eviction 302 to the XLC region 110. Thus, memory blocks in the SLC region 108 formerly containing evicted data may be subsequently used as the XLC region 110 memory blocks, which have a greater storage capacity (e.g., three-bit TLC, four-bit QLC, and so forth). As will be discussed in greater detail, evictions 302 from the SLC region 108 to the XLC region 110 occur gradually in accordance with eviction procedures. The evictions 302, which may occur when the memory array 106 is in a runtime state (e.g., actively writing data) or when the memory array 106 is in an idle state (e.g., not actively writing data), may enable the memory array 106 to meet quality of service (QOS) constraints more readily such as, for example, consistent/predictable write bandwidth, minimum storage capacity, and so forth.

Additionally, or alternatively, memory blocks in the XLC region 110 are capable of being converted into the single-level cell (SLC) region 108 memory blocks via insertion 304. Each cell in the XLC region 110 may generally be programmed to contain multiple bits of data. For example, if the XLC region 110 includes tri-level cell (TLC) memory, each cell in the XLC region 110 is capable of being programmed to contain three bits of data, if the XLC region 110 includes quad-level cell (QLC) memory, each cell in the XLC region 110 is capable of being programmed to contain four bits of data, and so forth.

Thus, converting the memory blocks in the XLC region 110 into the SLC region 108 memory blocks typically involves reducing the number of distinct voltage levels used to program the converted memory blocks, which may in turn increase the speed at which the converted blocks can be programmed. Accordingly, the conversion may improve the write bandwidth of the SLC region 110. A user of the memory array 106 may perceive improved write bandwidth in the form of enhanced performance and faster writes to the SLC region 108 as compared to the XLC region 110.

Figure 4:
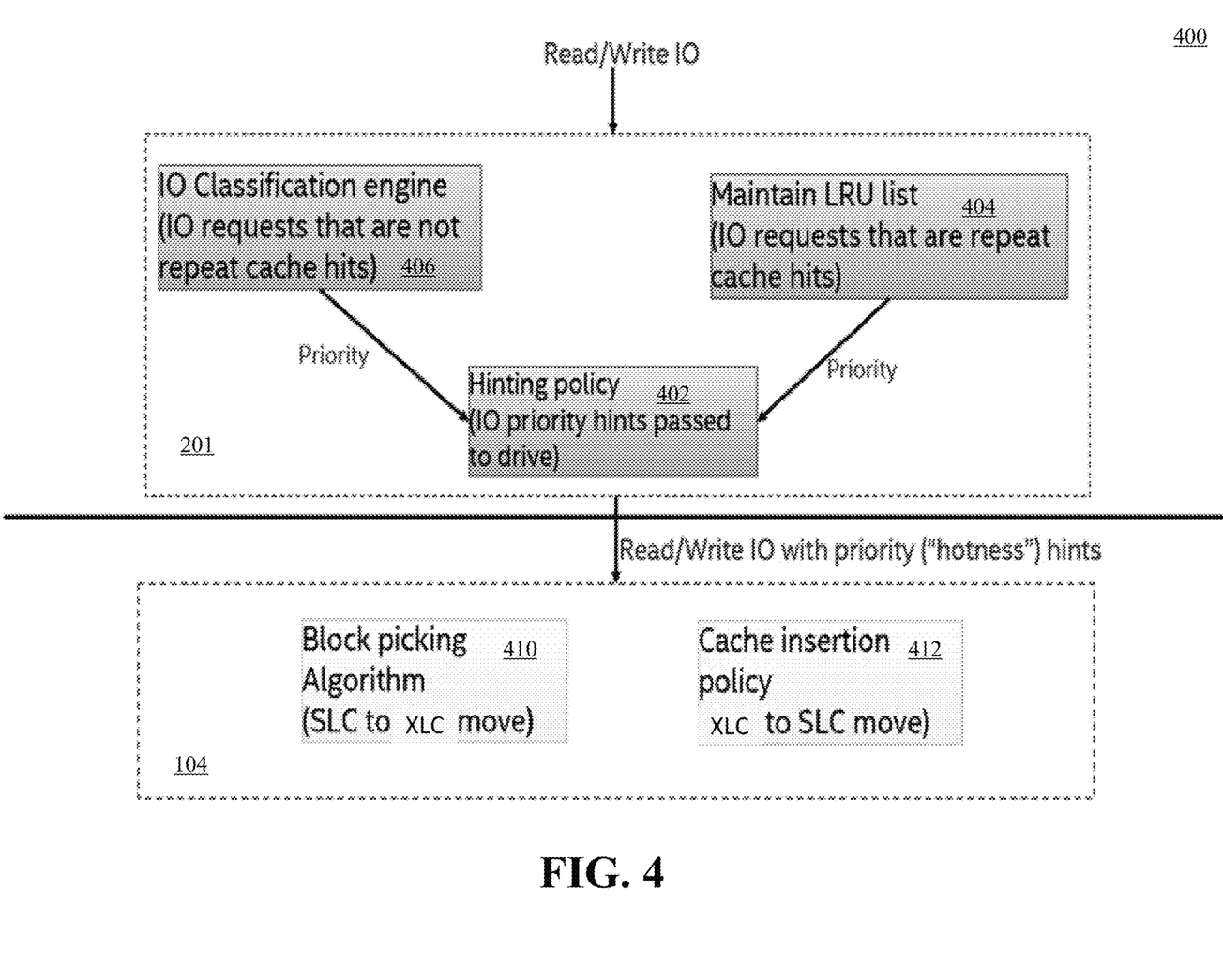
FIG. 4 is an illustration of an example diagram of a cloud computing system to manage cache evictions and/or insertions based at least in part on host managed hotness data according to an embodiment.

FIG. 4 is an illustration of an example diagram of cloud computing system 400 to manage cache evictions and/or insertions based at least in part on host managed hotness data. As illustrated, operations of the host 201 are implementable via software e.g., via a storage driver) and operations of the memory controller 104 are implementable via firmware (e.g., via SSD firmware). However, other example implementations may be performed via various combinations of software, firmware, and/or hardware. The operations of the host 201 and the memory controller 104 work together to manage to keep "hot" data in an SLC region as much as is feasible.

In the illustrated example, the host 201 includes a hinting policy 402 that receives input from a Last Recently Used list 404 and/or a classification engine 406. For example, the Last Recently Used list 404 of repeat cache hits associated with read and write requests is maintained by the host 201. Similarly, classification of the type of data associated with read and write requests is performed via the classification engine 406 of the host. 201. Hotness data is determined, via the hinting policy 402 of the host 201, based on the Last Recently Used list 404 of repeat cache hits and the type of data associated with read and write requests determined by the classification engine 406 of the host. 201.

In some implementations, the memory controller 104 includes a block picking policy 410 and a cache insertion policy 412. In operation, read and write requests and associated hotness data are received by the memory controller 104 from the host 201. For example, a valid unit count of operational memory cells is maintained on a block-by-block basis by the block picking policy 410 of the memory controller 104. Similarly, a hotness index count is maintained on a block-by-block basis by the block picking policy 410. Memory blocks are selected for eviction based on the valid unit count and the hotness index count for eviction by the block picking policy 410.

Additionally, or alternatively, memory blocks are selected for insertion based on the hotness data by the cache insertion policy 412 of the memory controller 104. In some implementations, the cache insertion policy 412 selects at least one memory block of the plurality of memory blocks for insertion based at least in part on the hotness data, where the insertion is from the x-level cell region to the single level cell region.

In one implementation, the main responsibility for the host 201 managed cache software residing in a storage driver is to provide hints for I/O requests deemed to contain important or "hot" data. These cache promotion hints (e.g., XLC to SLC insertion) are provided for both read and write requests and apply to all blocks specified in the block count of the I/O request. The lowest hint value is used to indicate data that is not to be cached. The host 201 software will provide the cache admission policy in the form of hints attached to read and write I/O requests. These priority hints are based on a combination of simple I/O classification (e.g., Differentiated Storage Services (DSS)) with the addition of Bloom filters for frequency, and shadow cache history for recency. These priority hints can maximize cache effectiveness and minimize demands on SSD firmware.

In response to such priority hints, the SSD firmware uses these improved hints to insert and evict data between the SSD SLC and XLC regions, to maximize servicing host reads of high value data from the SLC region. Advantageously, the SSD firmware can request up-to-the-minute refresh of what data the host 201 software still considers hot, allowing for fine tuning of more accurate eviction decisions moving SLC data back to QLC.

Advantageously, the low overhead use by SSD firmware of these high-quality hints improves performance by modifying the garbage collection (GC) mechanism to provide a cache-like experience. Specifically, the block picking policy 410 for eviction of blocks from SLC to XLC leverages the low overhead hints and block validity to choose the victim block for eviction, which differs from a typical cache design.

Figure 5:
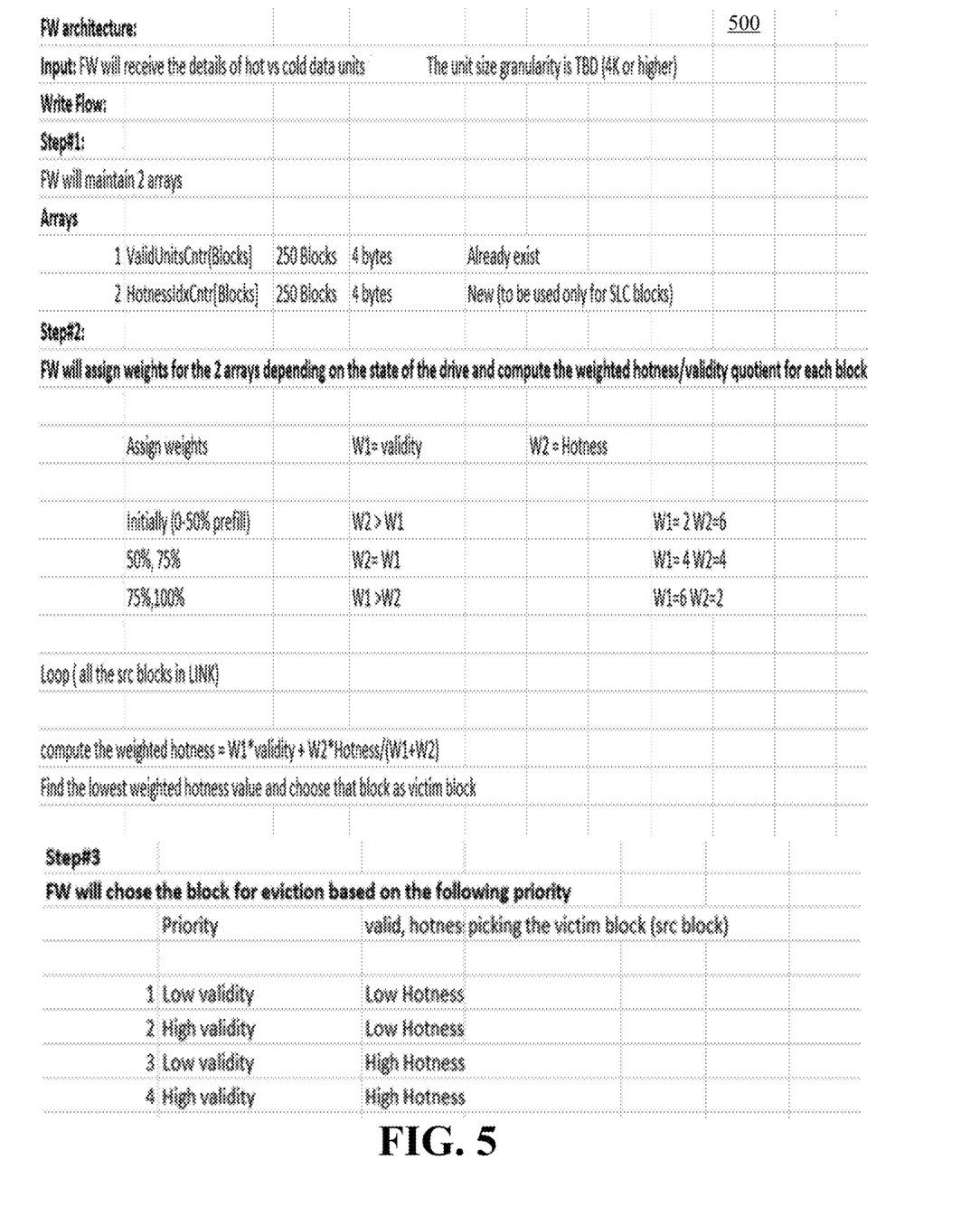
FIG. 5 is a chart of an example of a method of managing cache evictions and/or insertions based at least in part on host managed hotness data.

FIG. 5 shows an example chart of an example method 500 for managing cache evictions and/or insertions in a data server environment based at least in part on host managed hotness data. The method 500 may generally be implemented in a memory controller, such as, for example, the memory controllers (e.g., see FIGS. 1, 2, and 4), already discussed.

Illustrated operation "input" provides for receiving read and write requests and associated hotness data. For example, read and write requests and associated hotness data are received by a memory controller from a host.

Illustrated operation "step #1" provides for maintaining a valid unit count of operational memory cells and maintaining a hotness index count. For example, a valid unit count of operational memory cells is maintained on a block-by-block basis. Similarly, a hotness index count is maintained on a block-by-block basis.

Illustrated operation "step #2" provides for determining a weighted composite value. For example, a weighted composite value is determined based on the valid unit count and the hotness index count.

Illustrated operation "step #3" provides for determining a priority level for eviction. For example, memory blocks are selected for eviction based on the weighted composite value and/or on the priority level for eviction by the memory controller 104.

In some implementations, those blocks of the one or more memory blocks where the valid unit count is beneath a validity threshold and the hotness index count is beneath a hotness threshold are given a highest priority level (e.g., priority level 1) for eviction from the plurality of priority levels. Similarly, those blocks of the one or more memory blocks where the valid unit count is above the validity threshold and the hotness index count is above the hotness threshold are given a lowest priority level (e.g., priority level 4) for eviction from the plurality of priority levels. Likewise, those blocks of the one or more memory blocks where the valid unit count is above the validity threshold and the hotness index count is below the hotness threshold are given an intermediate priority level (e.g., priority level 2) for eviction from the plurality of priority levels. In such an example, the intermediate priority level (e.g., priority level 2) falls between the highest priority level (e.g., priority level 1) and the lowest priority level (e.g., priority level 4). Further, those blocks of the one or more memory blocks where the valid unit count is below the validity threshold and the hotness index count is above the hotness threshold are given a penultimate priority level (e.g., priority level 3) for eviction from the plurality of priority levels. In such an example, the penultimate priority level (e.g., priority level 2) falls between the intermediate priority level (e.g., priority level 2) and the lowest priority level (e.g., priority level 4).

In operation, when an I/O request with a high priority hint value is received from the host, the data associated with the I/O request is considered high value (e.g., "hot" data). Associated with each block of NAND is an associated Heat Quotient (HQ) value indicating a relative measure of how much of the block is occupied by data previously marked as "Hot." To identify the source blocks for SLC to QLC eviction, the memory controller (e.g., via firmware) computes a function based on the NAND block's Heat Quotient (HQ) and Validity Count.

Additional and/or alternative operations for method 500 are described in greater detail below in the description of FIG. 6 and FIG. 7.

Figure 6:
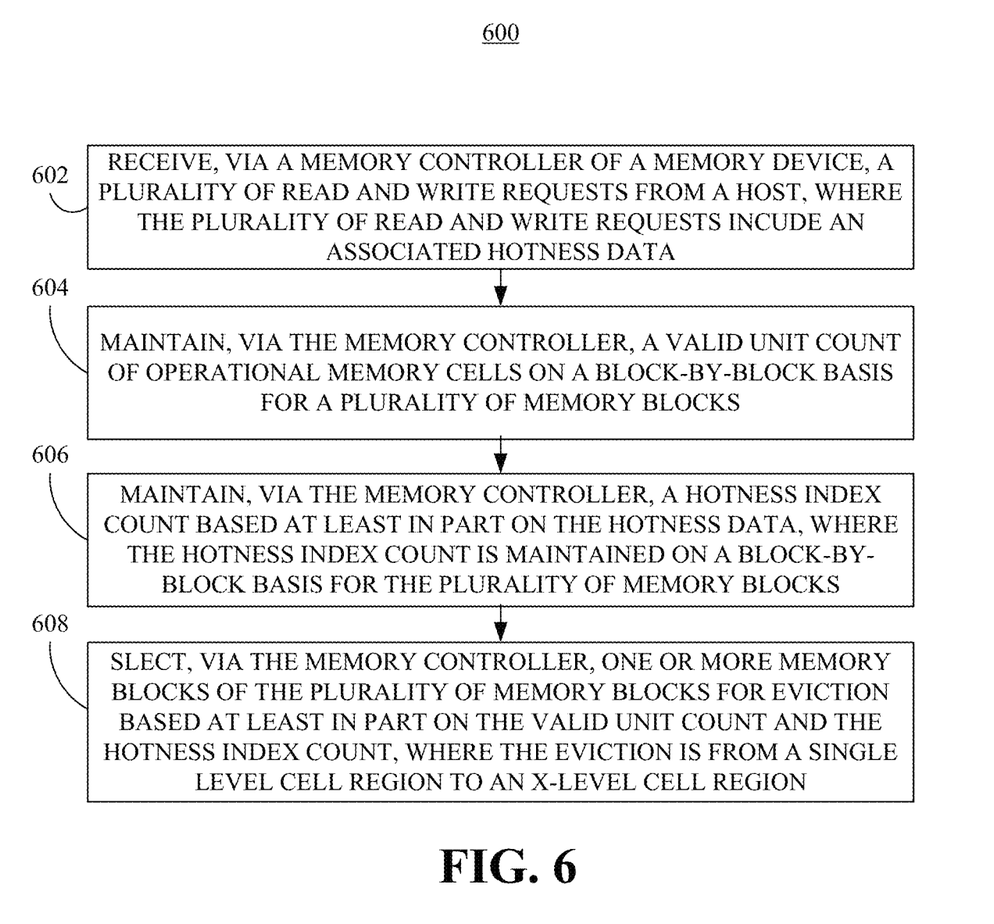
FIG. 6 is a flowchart of an example of another method of managing cache evictions and/or insertions based at least in part on host managed hotness data.

FIG. 6 is a flowchart of an example of another method 600 for managing cache evictions and/or insertions in a data server environment based at least in part on host managed hotness data. The method 600 may generally be implemented in a memory controller, such as, for example, the memory controllers (e.g., see FIGS. 1, 2, and 4), already discussed.

Illustrated processing block 602 provides for receiving read and write requests and associated hotness data. For example, read and write requests and associated hotness data are received by a memory controller from a host. In some implementations, a memory controller of a memory device receives a plurality of read and write requests from a host, where the plurality of read and write requests include an associated hotness data.

Illustrated processing block 604 provides for maintaining a valid unit count of operational memory cells. For example, a valid unit count of operational memory cells is maintained on a block-by-block basis. In some implementations, the memory controller maintains a valid unit count of operational memory cells on a block-by-block basis for a plurality of memory blocks.

Illustrated processing block 606 provides for maintaining a hotness index count. For example, a hotness index count is maintained on a block-by-block basis. In some implementations, the memory controller maintains a hotness index count based at least in part on the hotness data, wherein the hotness index count is maintained on a block-by-block basis for the plurality of memory blocks.

Illustrated processing block 608 provides for selecting memory blocks for eviction. For example, memory blocks are selected for eviction based on the valid unit count and the hotness index count. In some implementations, the memory controller selects one or more memory blocks of the plurality of memory blocks for eviction based at least in part on the valid unit count and the hotness index count, where the eviction is from a single level cell region to an x-level cell region.

Additional and/or alternative operations for method 600 are described in greater detail below in the description of FIG. 7.

Figure 7:
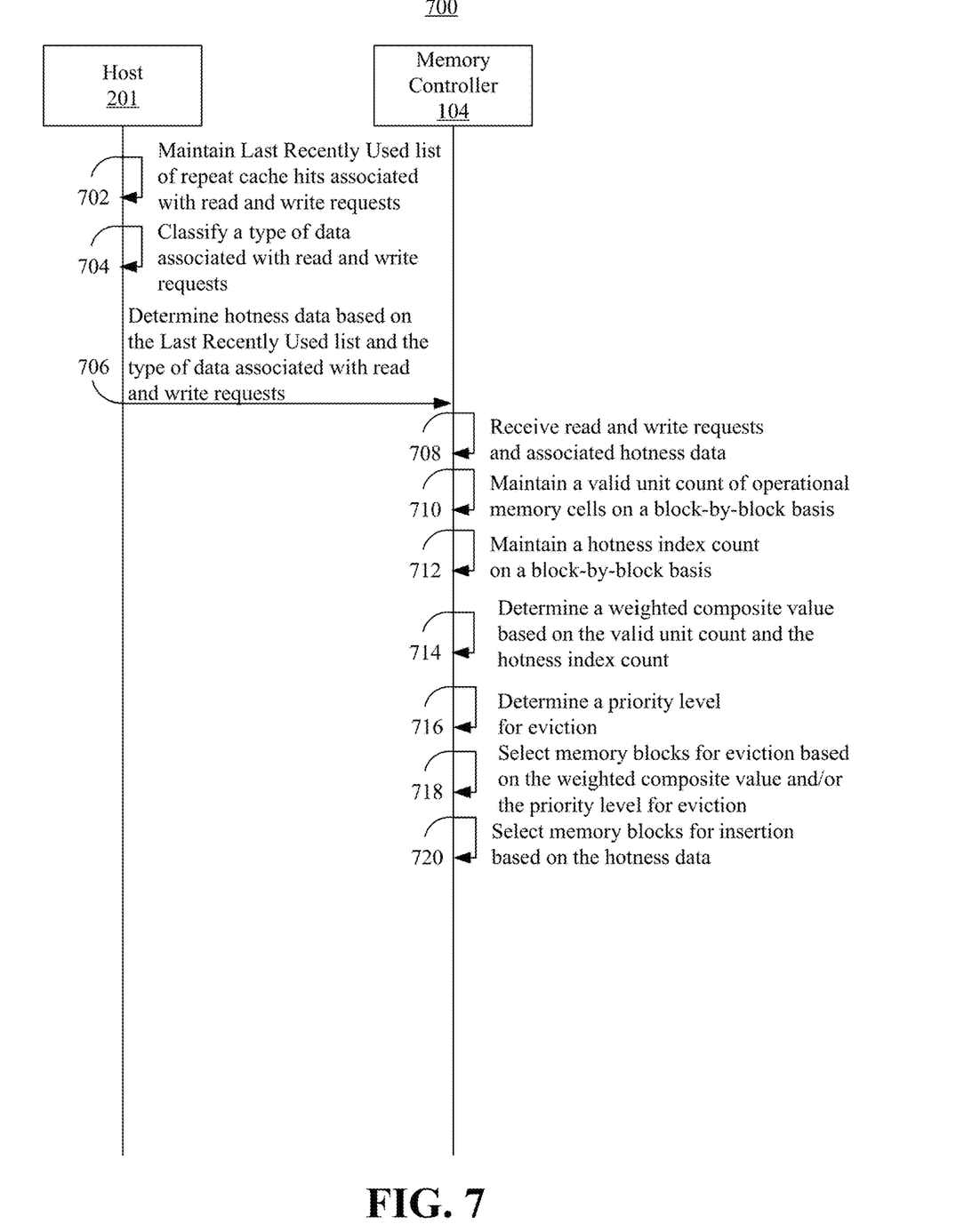
FIG. 7 is a flowchart of an example of a further method of managing cache evictions and/or insertions based at least in part on host managed hotness data.

FIG. 7 is a flowchart of an example of a further method 700 for managing cache evictions and/or insertions in a data server environment based at least in part on host managed hotness data. The method 700 may generally be implemented in a memory controller, such as, for example, the memory controllers (e.g., see FIGS. 1, 2, and 4), already discussed.

In the illustrated example, method 700 may be implemented via memory controller 104. As illustrated, the memory controller 104 may operate in communication with the host 201.

Illustrated processing block 702 provides for maintaining a Last Recently Used list. For example, a Last Recently Used list of repeat cache hits associated with read and write requests is maintained by the host 201.

Illustrated processing block 704 provides for classifying a type of data associated with read and write requests. For example, classification of the type of data associated with read and write requests is performed via the host. 201.

Illustrated processing block 706 provides for determining hotness data. For example, hotness data is determined, via the host 201, based on the Last Recently Used list of repeat cache hits and the type of data associated with read and write requests. In some implementations, the hotness data is based at least in part on a Last Recently Used list of repeat cache hits associated with the plurality of read and write requests and based at least in part on a type of data associated with the plurality of read and write requests.

Illustrated processing block 708 provides for receiving read and write requests and associated hotness data. For example, read and write requests and associated hotness data are received by the memory controller 104 from the host 201.

Illustrated processing block 710 provides for maintaining a valid unit count of operational memory cells. For example, a valid unit count of operational memory cells is maintained on a block-by-block basis by the memory controller 104.

Illustrated processing block 712 provides for maintaining a hotness index count. For example, a hotness index count is maintained on a block-by-block basis by the memory controller 104.

Illustrated processing block 714 provides for determining a weighted composite value. For example, a weighted composite value is determined based on the valid unit count and the hotness index count by the memory controller 104. In some implementations, the memory controller 104 determines a weighted composite value based at least in part on a valid unit weight value applied to the valid unit count and a hotness weight value applied to the hotness index count, where the selection of the one or more memory blocks is based on the weighted composite value.

Illustrated processing block 716 provides for determining a priority level for eviction. For example, a priority level for eviction is determined by the memory controller 104. In some implementations, the memory controller 104 determines a priority level from a plurality of priority levels for eviction based at least in part on the valid unit count and the hotness index count, where the selection of the one or more memory blocks is based on the priority level. For example, a default block picking order may be shuffled based on the procedures described above.

Illustrated processing block 718 provides for selecting memory blocks for eviction. For example, memory blocks are selected for eviction based on the weighted composite value and/or on the priority level for eviction by the memory controller 104.

For example, those blocks of the one or more memory blocks where the valid unit count is beneath a validity threshold and the hotness index count is beneath a hotness threshold are given a highest priority level for eviction from the plurality of priority levels. Similarly, those blocks of the one or more memory blocks where the valid unit count is above the validity threshold and the hotness index count is above the hotness threshold are given a lowest priority level for eviction from the plurality of priority levels. Likewise, those blocks of the one or more memory blocks where the valid unit count is above the validity threshold and the hotness index count is below the hotness threshold are given an intermediate priority level for eviction from the plurality of priority levels. In such an example, the intermediate priority level falls between the highest priority level and the lowest priority level. Further, those blocks of the one or more memory blocks where the valid unit count is below the validity threshold and the hotness index count is above the hotness threshold are given a penultimate priority level for eviction from the plurality of priority levels. In such an example, the penultimate priority level falls between the intermediate priority level and the lowest priority level.

Illustrated processing block 720 provides for selecting memory blocks for insertion. For example, memory blocks are selected for insertion based on the hotness data by the memory controller 104. In some implementations, the memory controller 104 selects at least one memory block of the plurality of memory blocks for insertion based at least in part on the hotness data, where the insertion is from the x-level cell region to the single level cell region.

In operation, when SLC to XLC garbage collection happens, it is possible that some hot units will be moved to XLC. During Read 10, when hot data points to QLC, the memory controller 104 (e.g., via firmware) will insert the hot data unit into SLC. Since write amplification will be greater than existing solutions due to these read insertions, the memory controller 104 (e.g., via firmware) can choose to limit the amount of write amplification by ignoring cache insertions that would normally result from high priority host read requests to data in the XLC region. In some implementation, one optimization to manage two separate active blocks for SLC writes (e.g., one for low priority data and the other for high priority data) can improve the accuracy of heat quotient values that are used for eviction selection by not mixing low and high priority data in the same block.

Additionally, memory controller 104 can periodically request updates from the host 201 as to what data the host 201 still considers hot, allowing for more accurate eviction of SLC data back to XLC.

Additional details regarding the various implementations of Method 700 are discussed below with regard to FIG. 9.

Figure 8:
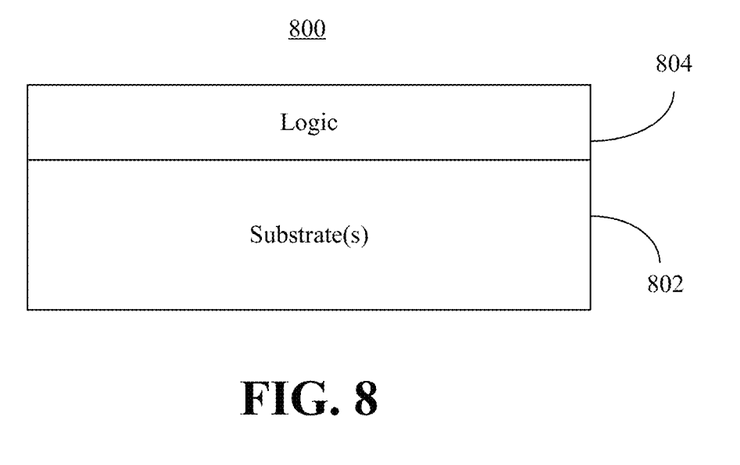
FIG. 8 is an illustration of an example of a semiconductor package apparatus according to an embodiment.

FIG. 8 shows a semiconductor apparatus 800 (e.g., chip and/or package). The illustrated apparatus 800 includes one or more substrates 802 (e.g., silicon, sapphire, gallium arsenide) and logic 804 (e.g., transistor array and other integrated circuit/IC components) coupled to the substrate(s) 802. In an embodiment, the logic 804 implements one or more aspects of the method 600 (FIG. 6) and/or the method 700 (FIG. 7), already discussed.

Thus, when operated as a controller, the logic 804 is to receive a plurality of read and write requests from a host, where the plurality of read and write requests include an associated hotness data. A valid unit count of operational memory cells is maintained on a block-by-block basis for a plurality of memory blocks by the logic 804. A hotness index count is also maintained by the logic 804 based at least in part on the hotness data on a block-by-block basis for the plurality of memory blocks. One or more memory blocks of the plurality of memory blocks are selected by the logic 804 for eviction from a single level cell region to an x-level cell region based at least in part on the valid unit count and the hotness index count.

In one example, the logic 804 includes transistor channel regions that are positioned (e.g., embedded) within the substrate(s) 802. Thus, the interface between the logic 804 and the substrate 802 may not be an abrupt junction. The logic 804 may also be considered to include an epitaxial layer that is grown on an initial wafer of the substrate 802.

Figure 9:
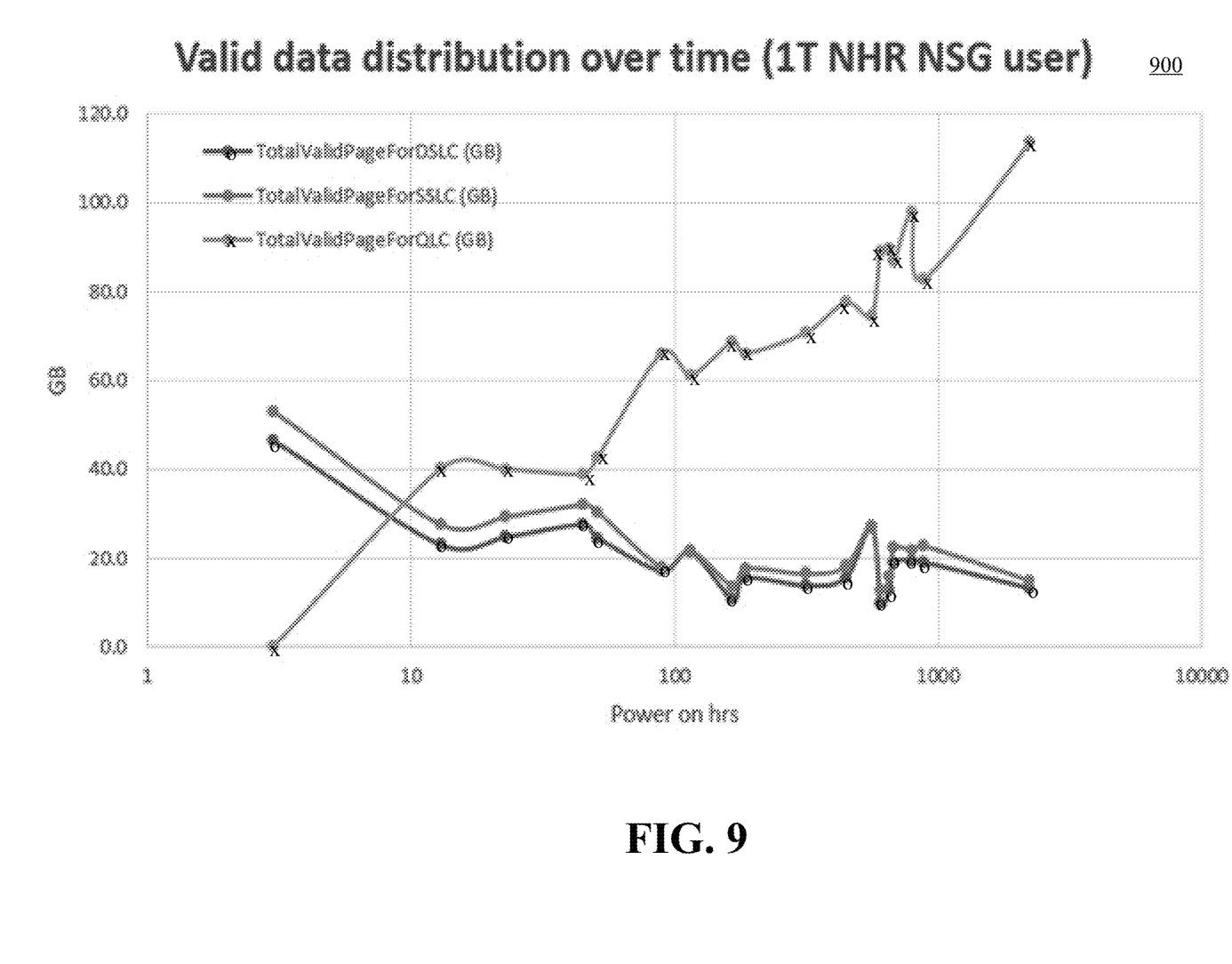
FIG. 9 is a chart that provides an illustration of potential improved read performance according to an embodiment.

FIG. 9 shows a chart 900 that provides an illustration of potential improved read performance according to an embodiment. As illustrated, the opportunity for improved read performance is shown in chart 900, which was taken from a user trace showing valid data distribution between SLC (e.g., fast media) and QLC (e.g., slow media) within the SSD. More valid data gets moved to QLC as early as 10 hrs here (day 2 or later). As late as by week 1 there are more valid data in the QLC region than the SLC region. This is because the method 600 (FIG. 6) and/or the method 700 (FIG. 7), already discussed, actively moves the data from SLC to QLC during idle time to free up the SLC region for faster write throughput. In such scenarios, it is advantageous to keep the hot data or high priority data in SLC and move only the low priority data to QLC.

ADDITIONAL NOTES AND EXAMPLES

Example 1 includes a semiconductor apparatus comprising one or more substrates; and logic coupled to the one or more substrates, where the logic is implemented at least partly in one or more of configurable or fixed-functionality hardware logic. The logic is to: receive, via a memory controller of a memory device, a plurality of read and write requests from a host, where the plurality of read and write requests include an associated hotness data; maintain, via the memory controller, a valid unit count of operational memory cells on a block-by-block basis for a plurality of memory blocks; maintain, via the memory controller, a hotness index count based at least in part on the hotness data, where the hotness index count is maintained on a block-by-block basis for the plurality of memory blocks; and select, via the memory controller, one or more memory blocks of the plurality of memory blocks for eviction based at least in part on the valid unit count and the hotness index count, where the eviction is from a single level cell region to an x-level cell region.

Example 2 includes the semiconductor apparatus of Example 1, where the hotness data is based at least in part on a Last Recently Used list of repeat cache hits associated with the plurality of read and write requests and based at least in part on a type of data associated with the plurality of read and write requests.

Example 3 includes the semiconductor apparatus of Example 1, where the logic is further to: determine, via the memory controller, a weighted composite value based at least in part on a valid unit weight value applied to the valid unit count and a hotness weight value applied to the hotness index count, where the selection of the one or more memory blocks is based on the weighted composite value.

Example 4 includes the semiconductor apparatus of Example 1, where the logic is further to: determine, via the memory controller, a priority level from a plurality of priority levels for eviction based at least in part on the valid unit count and the hotness index count, where the selection of the one or more memory blocks is based on the priority level.

Example 5 includes the semiconductor apparatus of Example 4, where those blocks of the one or more memory blocks where the valid unit count is beneath a validity threshold and the hotness index count is beneath a hotness threshold are given a highest priority level for eviction from the plurality of priority levels, and where those blocks of the one or more memory blocks where the valid unit count is above the validity threshold and the hotness index count is above the hotness threshold are given a lowest priority level for eviction from the plurality of priority levels.

Example 6 includes the semiconductor apparatus of Example 5, where those blocks of the one or more memory blocks where the valid unit count is above the validity threshold and the hotness index count is below the hotness threshold are given an intermediate priority level for eviction from the plurality of priority levels, where the intermediate priority level falls between the highest priority level and the lowest priority level, where those blocks of the one or more memory blocks where the valid unit count is below the validity threshold and the hotness index count is above the hotness threshold are given a penultimate priority level for eviction from the plurality of priority levels, where the penultimate priority level falls between the intermediate priority level and the lowest priority level.

Example 7 includes the semiconductor apparatus of Example 1, where the logic is further to: select, via the memory controller, at least one memory block of the plurality of memory blocks for insertion based at least in part on the hotness data, where the insertion is from the x-level cell region to the single level cell region.

Example 8 includes a storage device comprising a power supply to provide power to the storage device; a memory array including a single-level cell region and an x-level cell region; and a memory controller. The memory controller including logic to: receive, via a memory controller of a memory device, a plurality of read and write requests from a host, where the plurality of read and write requests include an associated hotness data; maintain, via the memory controller, a valid unit count of operational memory cells on a block-by-block basis for a plurality of memory blocks; maintain, via the memory controller, a hotness index count based at least in part on the hotness data, where the hotness index count is maintained on a block-by-block basis for the plurality of memory blocks; and select, via the memory controller, one or more memory blocks of the plurality of memory blocks for eviction based at least in part on the valid unit count and the hotness index count, where the eviction is from a single level cell region to an x-level cell region.

Example 9 includes the storage device of Example 8, where the hotness data is based at least in part on a Last Recently Used list of repeat cache hits associated with the plurality of read and write requests and based at least in part on a type of data associated with the plurality of read and write requests.

Example 10 includes the storage device of Example 8, where the logic is further to: determine, via the memory controller, a weighted composite value based at least in part on a valid unit weight value applied to the valid unit count and a hotness weight value applied to the hotness index count, where the selection of the one or more memory blocks is based on the weighted composite value.

Example 11 includes the storage device of Example 8, where the logic is further to: determine, via the memory controller, a priority level from a plurality of priority levels for eviction based at least in part on the valid unit count and the hotness index count, where the selection of the one or more memory blocks is based on the priority level.

Example 12 includes the storage device of Example 11, where those blocks of the one or more memory blocks where the valid unit count is beneath a validity threshold and the hotness index count is beneath a hotness threshold are given a highest priority level for eviction from the plurality of priority levels, and where those blocks of the one or more memory blocks where the valid unit count is above the validity threshold and the hotness index count is above the hotness threshold are given a lowest priority level for eviction from the plurality of priority levels.

Example 13 includes the storage device of Example 12, where those blocks of the one or more memory blocks where the valid unit count is above the validity threshold and the hotness index count is below the hotness threshold are given an intermediate priority level for eviction from the plurality of priority levels, where the intermediate priority level falls between the highest priority level and the lowest priority level, where those blocks of the one or more memory blocks where the valid unit count is below the validity threshold and the hotness index count is above the hotness threshold are given a penultimate priority level for eviction from the plurality of priority levels, where the penultimate priority level falls between the intermediate priority level and the lowest priority level.

Example 14 includes the storage device of Example 8, where the logic is further to: select, via the memory controller, at least one memory block of the plurality of memory blocks for insertion based at least in part on the hotness data, where the insertion is from the x-level cell region to the single level cell region.

Example 15 includes at least one computer readable medium, comprising a set of instructions, which when executed by a computing device, cause the computing device to: receive, via a memory controller of a memory device, a plurality of read and write requests from a host, where the plurality of read and write requests include an associated hotness data; maintain, via the memory controller, a valid unit count of operational memory cells on a block-by-block basis for a plurality of memory blocks; maintain, via the memory controller, a hotness index count based at least in part on the hotness data, where the hotness index count is maintained on a block-by-block basis for the plurality of memory blocks; and select, via the memory controller, one or more memory blocks of the plurality of memory blocks for eviction based at least in part on the valid unit count and the hotness index count, where the eviction is from a single level cell region to an x-level cell region.

Example 16 includes the at least one computer readable medium of Example 15, where the hotness data is based at least in part on a Last Recently Used list of repeat cache hits associated with the plurality of read and write requests and based at least in part on a type of data associated with the plurality of read and write requests.

Example 17 includes the at least one computer readable medium of Example 15, where the set of instructions, which when executed by the computing device, cause the computing device further to: determine, via the memory controller, a weighted composite value based at least in part on a valid unit weight value applied to the valid unit count and a hotness weight value applied to the hotness index count, where the selection of the one or more memory blocks is based on the weighted composite value.

Example 18 includes the at least one computer readable medium of Example 15, where the set of instructions, which when executed by the computing device, cause the computing device further to: determine, via the memory controller, a priority level from a plurality of priority levels for eviction based at least in part on the valid unit count and the hotness index count, where the selection of the one or more memory blocks is based on the priority level.

Example 19 includes the at least one computer readable medium of Example 18, where those blocks of the one or more memory blocks where the valid unit count is beneath a validity threshold and the hotness index count is beneath a hotness threshold are given a highest priority level for eviction from the plurality of priority levels, and where those blocks of the one or more memory blocks where the valid unit count is above the validity threshold and the hotness index count is above the hotness threshold are given a lowest priority level for eviction from the plurality of priority levels.

Example 20 includes the at least one computer readable medium of Example 15, where the set of instructions, which when executed by the computing device, cause the computing device further to: select, via the memory controller, at least one memory block of the plurality of memory blocks for insertion based at least in part on the hotness data, where the insertion is from the x-level cell region to the single level cell region.

Example 21 includes a method, comprising: receiving, via a memory controller of a memory device, a plurality of read and write requests from a host, where the plurality of read and write requests include an associated hotness data; maintaining, via the memory controller, a valid unit count of operational memory cells on a block-by-block basis for a plurality of memory blocks; maintaining, via the memory controller, a hotness index count based at least in part on the hotness data, where the hotness index count is maintained on a block-by-block basis for the plurality of memory blocks; and selecting, via the memory controller, one or more memory blocks of the plurality of memory blocks for eviction based at least in part on the valid unit count and the hotness index count, where the eviction is from a single level cell region to an x-level cell region.

Example 22 includes the method of Example 21, where the hotness data is based at least in part on a Last Recently Used list of repeat cache hits associated with the plurality of read and write requests and based at least in part on a type of data associated with the plurality of read and write requests.

Example 23 includes the method of Example 21, further comprising: determining, via the memory controller, a weighted composite value based at least in part on a valid unit weight value applied to the valid unit count and a hotness weight value applied to the hotness index count, where the selection of the one or more memory blocks is based on the weighted composite value.

Example 24 includes the method of Example 21, further comprising: determining, via the memory controller, a priority level from a plurality of priority levels for eviction based at least in part on the valid unit count and the hotness index count, where the selection of the one or more memory blocks is based on the priority level.

Example 25 includes the method of Example 24, where those blocks of the one or more memory blocks where the valid unit count is beneath a validity threshold and the hotness index count is beneath a hotness threshold are given a highest priority level for eviction from the plurality of priority levels, and where those blocks of the one or more memory blocks where the valid unit count is above the validity threshold and the hotness index count is above the hotness threshold are given a lowest priority level for eviction from the plurality of priority levels.

Example 25 includes the method of Example 21, further comprising: selecting, via the memory controller, at least one memory block of the plurality of memory blocks for insertion based at least in part on the hotness data, where the insertion is from the x-level cell region to the single level cell region.

Example 26 includes an apparatus comprising means for performing the method of any one of Examples 21 to 25.

Example 27 includes a machine-readable storage comprising machine-readable instructions which, when executed, implement the method of any one of Examples 21 to 25.

Technology described herein may therefore provide a performance-enhanced enhanced computing platform to the extent that it may advantageously improve resource utilization. For example, technology described herein is advantageously capable of implementation in a DRAMless SSD. Additionally, overhead of a host storage driver is advantageously reduced as compared to implementations where the host storage driver is actively controlling evictions and insertions.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising:
one or more substrates; and
logic coupled to the one or more substrates, wherein the logic is implemented at least partly in one or more of configurable or fixed-functionality hardware logic, the logic to:
   receive, via a memory controller of a memory device, a plurality of read and write requests from a host, wherein the plurality of read and write requests include an associated hotness data,
   maintain, via the memory controller, a valid unit count, wherein the valid unit count comprises a count of valid operational memory cells on a block-by-block basis for a plurality of memory blocks,
   maintain, via the memory controller, a hotness index count based at least in part on the hotness data, wherein the hotness index count is maintained on a block-by-block basis for the plurality of memory blocks,
   determine, via the memory controller, a weighted composite value based at least in part on a valid unit weight value applied to the valid unit count and a hotness weight value applied to the hotness index count, and
   select, via the memory controller, one or more memory blocks of the plurality of memory blocks for eviction based at least in part on the valid unit count, the hotness index count, and the weighted composite value, wherein the eviction is from a single level cell region to an x-level cell region.

2. The semiconductor apparatus of claim 1, wherein the hotness data is based at least in part on a Last Recently Used list of repeat cache hits associated with the plurality of read and write requests and based at least in part on a type of data associated with the plurality of read and write requests.

3. The semiconductor apparatus of claim 1, wherein the logic is further to:
select, via the memory controller, at least one memory block of the plurality of memory blocks for insertion based at least in part on the hotness data, wherein the insertion is from the x-level cell region to the single level cell region.

4. A semiconductor apparatus comprising:
one or more substrates; and
logic coupled to the one or more substrates, wherein the logic is implemented at least partly in one or more of configurable or fixed-functionality hardware logic, the logic to:
   receive, via a memory controller of a memory device, a plurality of read and write requests from a host, wherein the plurality of read and write requests include an associated hotness data,
   maintain, via the memory controller, a valid unit count, wherein the valid unit count comprises a count of valid operational memory cells on a block-by-block basis for a plurality of memory blocks,
   maintain, via the memory controller, a hotness index count based at least in part on the hotness data, wherein the hotness index count is maintained on a block-by-block basis for the plurality of memory blocks,
   determine, via the memory controller, a priority level from a plurality of priority levels for eviction based at least in part on the valid unit count and the hotness index count, wherein:
      one or more memory blocks of the plurality of memory blocks where the valid unit count is beneath a validity threshold and the hotness index count is beneath a hotness threshold are given a highest priority level for eviction from the plurality of priority levels;
      one or more memory blocks of the plurality of memory blocks where the valid unit count is above the validity threshold and the hotness index count is above the hotness threshold are given a lowest priority level for eviction from the plurality of priority levels;
      one or more memory blocks of the plurality of memory blocks where the valid unit count is above the validity threshold and the hotness index count is below the hotness threshold are given an intermediate priority level for eviction from the plurality of priority levels, wherein the intermediate priority level falls between the highest priority level and the lowest priority level;
      one or more memory blocks of the plurality of memory blocks where the valid unit count is below the validity threshold and the hotness index count is above the hotness threshold are given a penultimate priority level for eviction from the plurality of priority levels, wherein the penultimate priority level falls between the intermediate priority level and the lowest priority level; and select, via the memory controller, one or more memory blocks of the plurality of memory blocks for eviction based at least in part on the valid unit count, the hotness index count, and the priority level, wherein the eviction is from a single level cell region to an x-level cell region.

5. A storage device comprising:

a memory array including a single-level cell region and an x-level cell region; and a memory controller coupled to the memory array, the memory controller to:

receive, via the memory controller, a plurality of read and write requests from a host, wherein the plurality of read and write requests include an associated hotness data, maintain, via the memory controller, a valid unit count, wherein the valid unit count comprises a count of valid operational memory cells on a block-by-block basis for a plurality of memory blocks, maintain, via the memory controller, a hotness index count based at least in part on the hotness data, wherein the hotness index count is maintained on a block-by-block basis for the plurality of memory blocks, determine, via the memory controller, a weighted composite value based at least in part on a valid unit weight value applied to the valid unit count and a hotness weight value applied to the hotness index count, and select, via the memory controller, one or more memory blocks of the plurality of memory blocks for eviction based at least in part on the valid unit count, the hotness index count, and the weighted composite value, wherein the eviction is from a single level cell region to an x-level cell region.

6. The storage device of claim 5, wherein the hotness data is based at least in part on a Last Recently Used list of repeat cache hits associated with the plurality of read and write requests and based at least in part on a type of data associated with the plurality of read and write requests.

7. The storage device of claim 5, wherein the logic is further to:

select, via the memory controller, at least one memory block of the plurality of memory blocks for insertion based at least in part on the hotness data, wherein the insertion is from the x-level cell region to the single level cell region.

8. A storage device comprising:

a memory array including a single-level cell region and an x-level cell region; and a memory controller coupled to the memory array, the memory controller to:

receive, via the memory controller, a plurality of read and write requests from a host, wherein the plurality of read and write requests include an associated hotness data, maintain, via the memory controller, a valid unit count, wherein the valid unit count comprises a count of valid operational memory cells on a block-by-block basis for a plurality of memory blocks, maintain, via the memory controller, a hotness index count based at least in part on the hotness data, wherein the hotness index count is maintained on a block-by-block basis for the plurality of memory blocks, determine, via the memory controller, a priority level from a plurality of priority levels for eviction based at least in part on the valid unit count and the hotness index count, wherein:

one or more memory blocks of the plurality of memory blocks where the valid unit count is beneath a validity threshold and the hotness index count is beneath a hotness threshold are given a highest priority level for eviction from the plurality of priority levels;

one or more memory blocks of the plurality of memory blocks where the valid unit count is above the validity threshold and the hotness index count is above the hotness threshold are given a lowest priority level for eviction from the plurality of priority levels;

one or more memory blocks of the plurality of memory blocks where the valid unit count is above the validity threshold and the hotness index count is below the hotness threshold are given an intermediate priority level for eviction from the plurality of priority levels, wherein the intermediate priority level falls between the highest priority level and the lowest priority level;

one or more memory blocks of the plurality of memory blocks where the valid unit count is below the validity threshold and the hotness index count is above the hotness threshold are given a penultimate priority level for eviction from the plurality of priority levels, wherein the penultimate priority level falls between the intermediate priority level and the lowest priority level; and select, via the memory controller, one or more memory blocks of the plurality of memory blocks for eviction based at least in part on the valid unit count, the hotness index count, and the priority level, wherein the eviction is from a single level cell region to an x-level cell region.

9. At least one non-transitory computer readable medium, comprising a set of instructions, which when executed by a computing device, cause the computing device to:

receive, via a memory controller of a memory device, a plurality of read and write requests from a host, wherein the plurality of read and write requests include an associated hotness data;

maintain, via the memory controller, a valid unit count, wherein the valid unit count comprises a count of valid operational memory cells on a block-by-block basis for a plurality of memory blocks;

maintain, via the memory controller, a hotness index count based at least in part on the hotness data, wherein the hotness index count is maintained on a block-by-block basis for the plurality of memory blocks;

determine, via the memory controller, a weighted composite value based at least in part on a valid unit weight value applied to the valid unit count and a hotness weight value applied to the hotness index count; and select, via the memory controller, one or more memory blocks of the plurality of memory blocks for eviction based at least in part on the valid unit count, the hotness index count, and the weighted composite value, wherein the eviction is from a single level cell region to an x-level cell region.

10. The at least one non-transitory computer readable medium of claim 9, wherein the hotness data is based at least in part on a Last Recently Used list of repeat cache hits associated with the plurality of read and write requests and based at least in part on a type of data associated with the plurality of read and write requests.

11. The at least one non-transitory computer readable medium of claim 9, wherein the set of instructions, which when executed by the computing device, cause the computing device further to:
determine, via the memory controller, a priority level from a plurality of priority levels for eviction based at least in part on the valid unit count and the hotness index count, wherein the selection of the one or more memory blocks is based on the priority level.

12. The at least one non-transitory computer readable medium of claim 11, wherein those blocks of the one or more memory blocks where the valid unit count is beneath a validity threshold and the hotness index count is beneath a hotness threshold are given a highest priority level for eviction from the plurality of priority levels, and wherein those blocks of the one or more memory blocks where the valid unit count is above the validity threshold and the hotness index count is above the hotness threshold are given a lowest priority level for eviction from the plurality of priority levels.

13. The at least one non-transitory computer readable medium of claim 9, wherein the set of instructions, which when executed by the computing device, cause the computing device further to:
select, via the memory controller, at least one memory block of the plurality of memory blocks for insertion based at least in part on the hotness data, wherein the insertion is from the x-level cell region to the single level cell region.

* * * * *